June 25, 1968     J. R. JOHNSON     3,389,470
DRAFTING DEVICE FOR CONSTRUCTING PERSPECTIVE DRAWINGS
Filed July 10, 1967     3 Sheets-Sheet 1
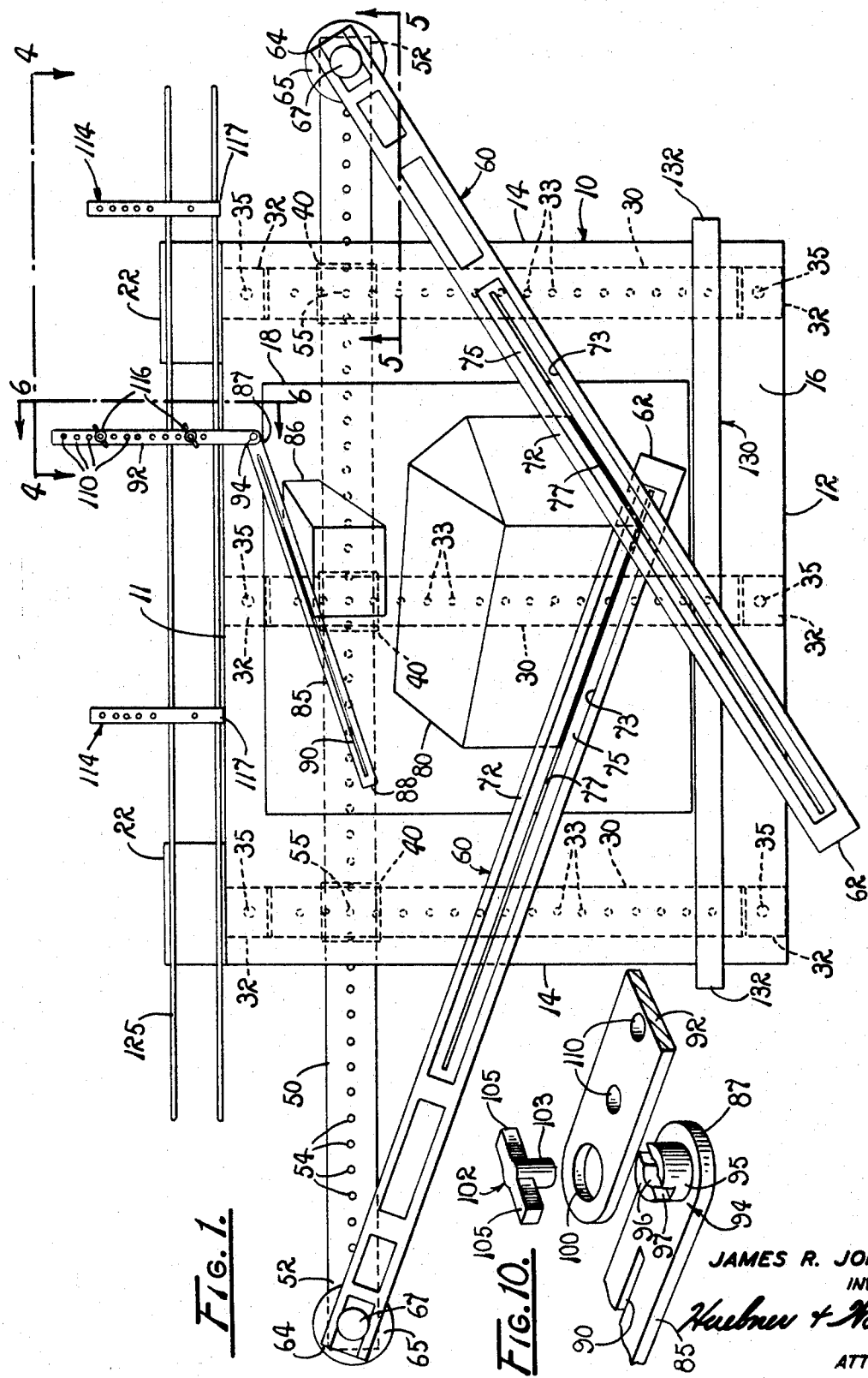
JAMES R. JOHNSON
INVENTOR
ATTORNEYS June 25, 1968  J. R. JOHNSON  3,389,470
DRAFTING DEVICE FOR CONSTRUCTING PERSPECTIVE DRAWINGS
Filed July 10, 1967  3 Sheets-Sheet 2
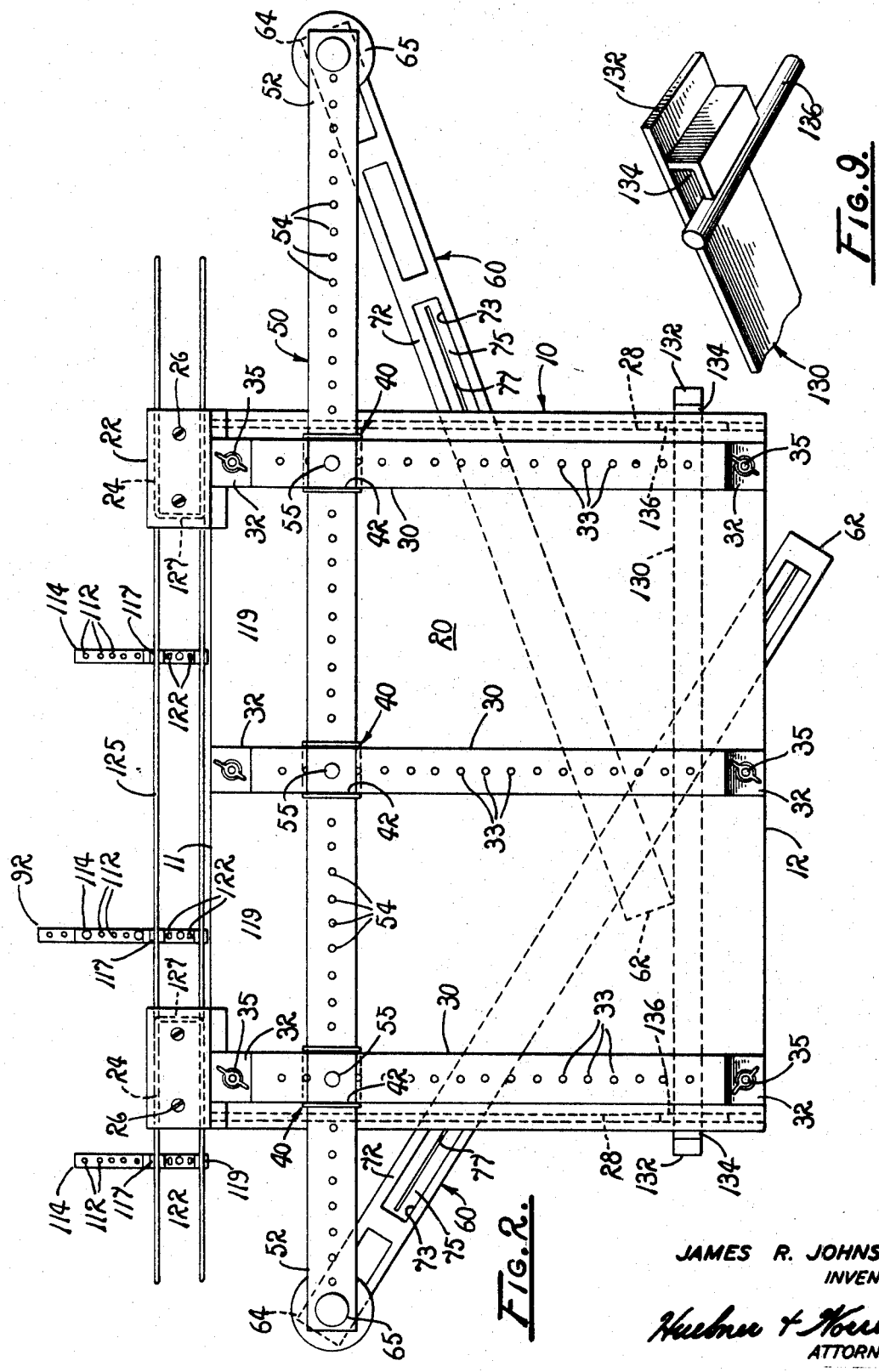
JAMES R. JOHNSON
INVENTOR
ATTORNEYS

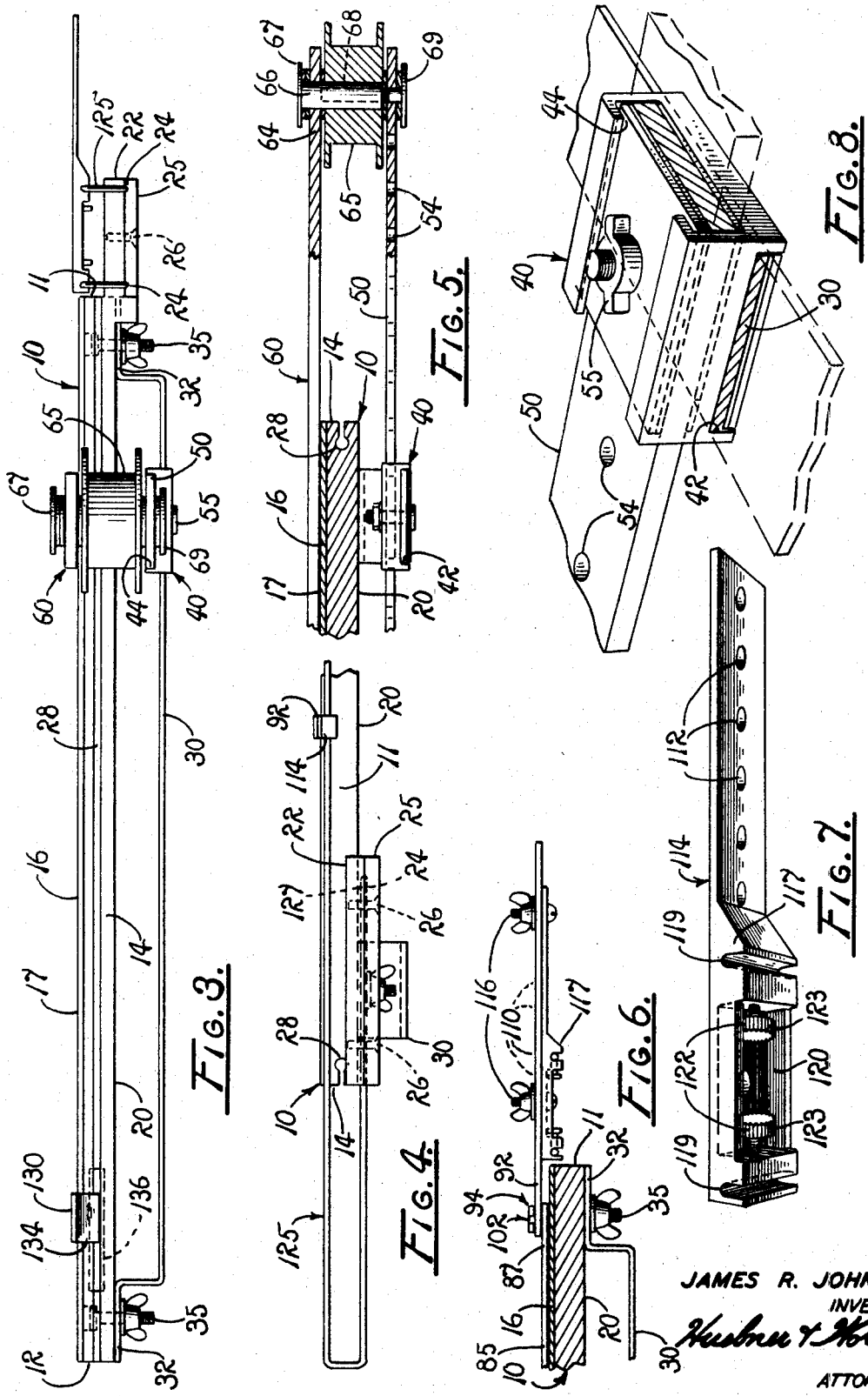

United States Patent Office 3,389,470
Patented June 25, 1968

3,389,470
DRAFTING DEVICE FOR CONSTRUCTING
PERSPECTIVE DRAWINGS
James R. Johnson, 1554 N. 4th St.,
Fresno, Calif. 93703
Filed July 10, 1967, Ser. No. 652,134
6 Claims. (Cl. 33—77)

ABSTRACT OF THE DISCLOSURE

A substantially flat drawing board having a pair of marker guide members disposed on the board for individual swinging movement about respective axes providing vanishing points for the guide members in adjusted positions spaced outwardly from the board for constructing two dimensional figures and a third marker guide member adjustably mounted on the board for swinging movement about an axis providing a vanishing point for the third guide member in adjusted positions upon the board for the construction of single dimensional figures.

Background of the invention

Perspective drawings are ordinarily divided into two classes, angular perspectives and parallel perspectives. The first class is generally known as a two-point perspective since neither face of the object to be drawn is parallel to the picture plane or plane of the drawing which requires two vanishing points for constructing each of the facing sides of the object. The second class is commonly known as a single-point perspective since the facing surface of the object to be drawn is parallel to the picture plane, requiring but a single vanishing point or center of vision for constructing the single viewable side of the object.

Perspective drawings are made by seevral methods of construction in which the station point from which the observer views the object is arbitrarily located on the drafting paper. The picture plane, horizon, ground line, and vanishing points or center of vision points are then constructed in proper relation to the station point and to each other. The precise location of these construction lines and points varies, of course, depending upon whether the drawing is a scale geometrical perspective or an artist's perspective. In either instance, after the construction lines and vanishing points are located, it is necessary to maintain them in their exact predetermined positions throughout the entire drafting operation. This is particularly true of the vanishing point location which, if even minutely displaced, causes greatly exaggerated distortions in the drawing. Heretofore, such construction lines and points have been made by employing hand-positioned drafting instruments such as T-squares, triangles and other straight-edged equipment. The prior art has also included various drafting devices which are pivotally mounted for angular adjustment on the board but are normally exclusively employed in the construction of orthographic figures and have not been readily adapted for use in constructing perspectives. Such drafting devices provide only limited swinging movement usually in a predetermined angular relation with respect to the board with the individual mounting of the marker guide arm or blade being disposed to preclude its use as a vanishing point which would be maintained throughout the entire drafting operation.

Depending upon the angular position of the object to be drawn with respect to the picture plane, as viewed by the observer from the station point, the proper vanishing point for properly drawing the longer side of the object may be disposed a substantial distance from the drawing under construction. In some instances, such vanishing point may be disposed completely off the board which would preclude the desired construction of that side of the figure with any degree of precision. Accordingly, the ability to construct a particular perspective drawing may be limited by the size of the board or by the particular location of the figure under construction on the board.

Accordingly, it is an object of the present invention to provide an improved drafting device for constructing perspective drawings.

Another object is to provide such an improved drafting device which may be used for constructing both one-point and two-point perspectives.

Another object is to provide a drafting device of the character described, which utilizes a drafting board having a plurality of infinetly adjustable vanishing points and center-of-vision points disposable both on and off the board.

Another object is to provide an improved drafting device which has a plurality of marker guide arms pivotally mounted on adjustable supports on the board for swinging movement about axes providing vanishing points for the arms.

Another object is to provide a drafting device in which the arms of the board include elongated slots adapted to accommodate suitable drafting instruments on the board in precise alignment with their respective vanishing points.

Other objects and advantages of the present invention will subsequently become more clearly apparent upon reference to the following description and accompanying drawings.

Brief description of the drawings

FIG. 1 is a top plan view of a drafting device embodying the principles of the present invention.

FIG. 2 is a bottom plan view of the drafting device of FIG. 1.

FIG. 3 is a side elevation of the drafting device of the preceding figures.

FIG. 4 is a fragmentary elevational view, as observed in the direction of the arrows on line 4—4 of FIG. 1.

FIG. 5 is a fragmentary elevation and partial section, taken on line 5—5 of FIG. 1, showing the pivot mounting of one of a pair of marker guide arms employed for constructing two-point perspectives.

FIG. 6 is a side elevation and partial section, taken on line 6—6 of FIG. 1, showing the mounting for a marker guide blade employed for constructing one-point perspectives.

FIG. 7 is a perspective of a mounting member for the marker guide blade of FIG. 6 removed from the drafting board.

FIG. 8 is a perspective view of one of a pair of adjustable supports for the marker guide arms of FIG. 5.

FIG. 9 is a fragmentary perspective of the slide mounting for a straight-edge ruler on the board.

FIG. 10 is a fragmentary perspective of a quick disconnect pivot coupling for the one-point marker guide blade shown separated for illustrative convenience.

Description of the preferred embodiment

Referring more particularly to the drawings, a drafting device embodying the principles of the present invention is shown providing a substantially rectangular flat drawing board 10 having opposite top and bottom edges 11 and 12, respectively, and opposite side edges 14. The board is of laminated construction and includes an upper cover plate 16 providing a drawing surface 17 for receiving a sheet of drafting paper 18. The board further includes a bottom surface 20 and a pair of brackets 22 extended from the top edge 11 individually adjacent to the side edges 14 of the board. The brackets provide a substantially U-shaped bore 24 and a cover 25 held in covering relation on the board, as best shown in FIG. 3, by one or more screws 26. As best shown in FIGS. 3 and 6, the side edges 14 of the board have an elongated key slot 28 formed between the top and bottom edges for a purpose hereinafter to be described.

A plurality of support rails 30 are mounted on the bottom surface 20 of the board 10 in spaced substantially parallel relation to each other and to the side edges 14 of the board. Each of the rails includes opposite mounting ends 32 and an intermediate portion disposed in spaced substantially parallel relation to the bottom surface 20 of the board. The intermediate portion provides a plurality of equally spaced apertures 33 therethrough with the rails being secured in the described position beneath the board by a plurality of bolt and wing nut assemblies 35 individually extendible through the mounting ends 32 of the rails and through the board with the bolts providing countersunk heads covered by the upper plates 16 of the bolt. A plurality of substantially square guide blocks 40 individually provide shallow grooves 42 therethrough which receive their respectively associated rails 30 for relative sliding movement longitudinally of the rails. Each of the blocks also includes a slot 44 therethrough in right angular relation to its respective groove 42.

An elongated support bar 50 is extended through the slots 44 in substantially right angular relation to the rails 30 and includes opposite ends 52 outwardly extended from their corresponding side edges 14 of the board 10. The bar has a plurality of equally longitudinally spaced apertures 54 therethrough which are selectively alignable with the apertures 33 in the rails to receive an elongated lock bolt and wing nut assembly 55 which is extendible centrally through their respective guide blocks 40 for holding the bar in predetermined axially adjusted positions and adjusted positions longitudinally of the rails.

A pair of marker guide arms 60 are disposed in superimposed relation on the upper drawing surface 17 of the drawing board 10. The arms include overlapping inner ends 62 and opposite outer ends 64. The outer ends of the arms are individually pivotally connected to their respectively associated ends 52 of the support bar 50. Such connection is provided by a spacer spool 65 through which is extended an elongated internally threaded sleeve 66 having an enlarged head 67 engaging the end of the guide arm. A threaded retaining bolt 68 is screw-threadably received within the sleeve and has an enlarged head 69 engageable with the support bar 50. The sleeve and retaining bolt provide a substantially upright axis about which the respective inner ends 62 of the guide arms are swung for adjusting the angular disposition of the arms upon the board. The arms are of laminated construction and include upper and lower frames 72 providing elongated rectangular openings 73 therethrough. An elongated insert 75 of transparent substantially rigid material such as plexiglass or other clear plastic material is sandwiched between the upper and lower frames and secured by a suitable adhesive, screws, or the like. An elongated slot 77 is formed in the insert in longitudinally aligned co-planar relation with the axis of rotation of the sleeve 66 and bolt 68 which is adapted to receive a suitable marking instrument for guiding the same during the drafting operation. It is noted that the guide slot 77 is precisely aligned with the axis of the sleeve and bolt which affords an adjustable vanishing point from a location spaced outwardly from the board. Furthermore, the arms may be effectively utilized for conveniently and precisely constructing each side of a figure 80 drawn in two-point perspective upon the drafting paper 18 with the vanishing points maintained in precise location during swinging movement of the inner ends of the arms upon the board. It is also noted that the support bar 50 is axially adjustable through the increments of adjustment provided by the spaced apertures 52 therein so as to move the vanishing point at one end of the bar farther outwardly from the board while the opposite vanishing point at the other end of the bar is moved correspondingly closer to the board.

A marker guide blade 85 is disposed adjacent to the top edge 11 of the drawing board 10 for constructing single-point perspective figures such as that identified by the reference numeral 86 on the drafting paper 18. The blade is swingably mounted on the upper drawing surface 17 of the board and provides a pivot end 87 and an opposite end 88. An elongated marker guide slot 90 is longitudinally extended between the ends of the blade for slidably receiving a suitable marking instrument therethrough. The pivot end of the blade is mounted on the end of an elongated adjusting strap 92 by a quick disconnect coupling, generally indicated by the reference numeral 94. The coupling includes a circular boss 95 which may be integral with or secured to the pivot end of the blade with the boss having a circular axially extended bore 96 therethrough and a transverse slot 97. The associated end of the strap 92 provides an aperture 100 which is slidable over and rotatable about the boss 95. A lock key 102 is provided having a cylindrical body portion 103 which is adapted to fit snugly within the bore 96 of the boss and diametrically opposed pins 105 receivable within the slot 97 in outward extension therefrom for precluding rotation of the lock key.

The adjusting strap 92 includes a plurality of longitudinally equally spaced apertures 110 therethrough which are selectively alignable with a plurality of similar apertures 112 in an elongated mounting bar 114. The strap and bar are constrained in their selected adjusted positions to locate the pivot end 87 of the guide blade 85 on the board by a pair of spaced bolt and wing nut assemblies 116. The mounting bar includes a head portion 117 which has a pair of longitudinally spaced transversely extended substantially parallel bores 119 therethrough and a centrally disposed recess 120 therebetween. A pair of thumb screws 122 are mounted in the head portion of the bar for movement into their individually associated bores 119 and include opposite gripping head positions 123 accessible within the recess 120. The mounting bar is slidably supported for movement along the top edge 11 of the drawing board 10 between the opposite side edges 14 thereof by an elongated continuous dual rod member 125 having spaced substantially parallel portions extended through the bores 119 in the mounting bar 114. The dual rod member provides opposite ends 127 which are individually received within the U-shaped bores 24 of their respectively associated brackets 22 on the drawing board.

An elongated straight-edge ruler 130 is disposed on the upper drawing surface 17 of the drawing board 10 for movement in continuous parallelism with and between the top and bottom edges 11 and 12, respectively, of the board. The ruler includes opposite ends 132 extended in overhanging relation with respect to the side edges 14 of the board and individually provide substantially L-shaped depending legs 134. An elongated rod 136 is mounted on the leg at each end of the ruler and is receivable within their respectively adjacent key slots 28 in the side edges 14 of the board to maintain the ruler in the described parallel relation throughout its range of movement on the board between the top and bottom edges.

*Operation*

The operation of the described embodiment of the subject invention is believed to be clearly apparent and is briefly summarized at this point. With the support bar 50 disposed in tightly held relation upon the rails 30 by the guide blocks 40 and their associated bolt and wing nut assemblies 55, the marker guide arms 60 may be swingable upon the upper drawing surface 17 of the board about their respective vanishing points provided by the sleeve and bolt 66 and 68, respectively. A suitable drafting instrument is extended through the guide slot 77 for constructing the lower edge, for example, of the figure 80 on the drafting paper 18 with the line resulting therefrom being precisely extended toward the vanishing point of the arm. By proper manipulation to swing the arm upwardly toward the top edge 11 of the board, any other lines on the right side of the figure, as viewed in FIG. 1, can be drawn with the assurance that such lines are precisely extended toward the vanishing point and a true perspective figure constructed.

It is readily apparent that any necessary precisely horizontal lines can be constructed by use of the slidable straight-edge ruler 130 which may also be employed as a guide and steady rest for other drafting instruments such as T-squares, triangles and the like. Furthermore, the straight-edge ruler is required for constructing the one-point perspective figure 86 whereby the horizontal-vertical lines depicting the front surface which is disposed within the picture plane are constructed. The guide blade 85 is utilized to construct the perspective lines of the viewable sides of the figure 86 by proper manipulation of the blade to its desired angular positions upon the board. Although not shown, longer or shorter guide blades may be substituted for the blade 85 during the drafting operation by removal of the lock key 102 from the boss 95 of the quick disconnect coupling 94. Furthermore, a pair of additional mounting bars 114 are shown disposed in sliding relation on the dual support rods 125 for providing several vanishing points and marker guide blades when required for constructing a number of single-point perspective figures on the drafting paper 18. It is further noted that the vanishing point provided by the quick disconnect coupling 94 between the guide blade 85 and the adjusting strap 92 is infinitely adjustable to positions disposed either on or off the board and spaced from either the top edge or the side edges of the board. In order to adjust the vanishing points at the ends of the support bar 50 for the guide arms 60, the bolt and wing nut assemblies 55 are quickly and easily removable from the guide blocks 40 in order to permit both axial adjustment of the support bar and transverse movement of the bar longitudinally of the rails 30 between the top and bottom edges 11 and 12, respectively, of the board. The guide arms 60 provide sufficient inherent flexibility in order to pass each other during the described adjustable swinging movement during the construction of a two-point perspective figure and passed the guide blade 85 and the straight-edge ruler 130 so that there is no appreciable interference between any of the described adjustable elements on the drafting board.

In view of the foregoing, it is readily apparent that the structure of the present invention provides an improved drafting device for constructing either one- or two-point perspective figures on a single sheet of drafting paper. Such construction is permissible after the initial adjustment of the various desired vanishing points for the guide arms and blade without further modification or adjustment of any of the described elements of the present invention. The convenience and versatility of such device are believed readily apparent and amply demonstrated in a manner not possible with any known drafting device for the purpose.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A drafting device for constructing perspective drawings and the like comprising a substantially flat board, marker guide means disposed in superimposed relation on the board and being adapted to guide a suitable marking instrument on the board, an elongated substantially rigid bar having opposite ends extended outwardly from the board and including means for individually pivotally mounting said marker guide means at said ends of the bar for swinging movement about an axis of rotation providing a variety of selectively adjusted positions on the board with said axis providing a vanishing point for said marker guide means in all said adjusted positions, rail means mounted beneath the board, and a slotted block slidably mounted on said rail means and slidably receiving said bar in substantially right anguler relation to said rail means for longitudinal adjustment of said bar to position said vanishing point toward and from the board and to permit adjustable movement of the bar on the board in a direction transversely of said longitudinal movement.

2. A drafting device for constructing perspective drawings and the like comprising a substantially rectangular flat board having predetermined upper and lower surfaces and top, bottom and opposite side edges; an elongated substantially rigid bar underlying the lower surface of the board and having opposite ends individually outwardly extended from said side edges of the board; a pair of marker guide arms having outer ends individually pivotally mounted on corresponding ends of the bar for independent swinging movement of each arm about an axis providing a vanishing point for its respective arm and including inner ends disposed on the upper surface of the board in overlapping relation during said swinging movement for constructing two dimensional figures upon the board; a pair of elongated rails mounted on the lower surface of the board in spaced substantially parallel relation and extended between said top and bottom edges of the board; and a pair of slotted blocks individually slidably mounted on said rails and slidably receiving said bar therethrough in substantially right angular relation to the rails for longitudinal adjustment of said bar to position said vanishing points toward and from the board and to permit adjustable movement of the bar between said top and bottom edges of the board further to adjust the positions of said vanishing points of the arms relative to the board.

3. The drafting device of claim 2 in which the arms individually include elongated longitudinally extended slots to receive the points of suitable marking instruments therethrough in guiding relation on the board with said slots precisely aligned with the vanishing point of their respective arms in all adjusted positions of the arms relative to the board.

4. The drafting device of claim 2 in which said rails and said bar provide spaced apertures therethrough providing a plurality of spaced increments of adjustment with respective apertures in the bar and rails being alignable within said block, and fastener means extendible through said aligned apertures and through the block for releasably constraining the bar in its adjusted positions.

5. The drafting apparatus of claim 6 including a marker guide blade disposed adjacent to said top edge of the board, a guide frame having a pair of elongated rods mounted in spaced substantially parallel relation along said top edge of the board, and an elongated support member slidably mounted on said rods pivotally mounting said blade for swinging movement of the blade about an axis of rotation providing a third vanishing point on the board for constructing single dimensioned figures.

6. The drafting device of claim 7 in which an elongated slot is formed in each of the side edges of the board; and an elongated straight-edged ruler slidably mounted on said upper surface of the board and having opposite ends disposed in overhanging relation to said side edges of the board, said ruler including a pair of elongated guide fingers individually disposed at said ends of the ruler inwardly slidably extended into their associated slots of the board to maintain the ruler in substantially parallel relation to the top and bottom edges of the board.

References Cited
UNITED STATES PATENTS

| | | | |
|---|---|---|---|
| 795,065 | 7/1905 | Ring | 33—77 |
| 2,667,694 | 2/1954 | McQuaid et al. | 33—77 |

HARRY N. HAROIAN, *Primary Examiner.*